United States Patent
Daems

(10) Patent No.: US 6,623,181 B1
(45) Date of Patent: Sep. 23, 2003

(54) SUPPORT FOR A SPLICE IN AN ELONGATE ELEMENT

(75) Inventor: Daniel Daems, 's-Gravenwezel (BE)

(73) Assignee: Tyco Electronics Raychem N.V., Kessel-Lo (BE)

( * ) Notice: Subject to any disclaimer, the term of this patent is extended or adjusted under 35 U.S.C. 154(b) by 0 days.

(21) Appl. No.: 09/674,426

(22) PCT Filed: Apr. 15, 1999

(86) PCT No.: PCT/GB99/01152

§ 371 (c)(1),
(2), (4) Date: Nov. 1, 2000

(87) PCT Pub. No.: WO99/57592

PCT Pub. Date: Nov. 11, 1999

(30) Foreign Application Priority Data

May 2, 1998 (GB) .............................. 9809387

(51) Int. Cl.[7] .............................. G02B 6/255
(52) U.S. Cl. ....................................... 385/99
(58) Field of Search .................... 385/90, 91, 92, 385/93, 94, 95, 96, 97, 98, 99, 147

(56) References Cited

U.S. PATENT DOCUMENTS

| 4,352,542 A | 10/1982 | Tydings ................. 350/96.21 |
| 4,667,869 A | 5/1987 | Gen et al. .................. 228/103 |
| 5,152,611 A | 10/1992 | Pieper et al. ............... 374/160 |
| 5,413,790 A | 5/1995 | Koppe et al. ............... 424/411 |
| 5,686,153 A | 11/1997 | Heynderickx et al. ......... 428/1 |

FOREIGN PATENT DOCUMENTS

| EP | 0 780 947 A2 | 6/1997 |
| GB | 2 109 418 A | 6/1983 |
| JP | 59126485 A | 7/1984 |
| JP | 61219011 | 9/1986 |
| JP | 62021107 | 1/1987 |
| WO | WO 88/09068 | 11/1988 |
| WO | WO 96/10260 | 4/1996 |

OTHER PUBLICATIONS

Toshiaki Katagiri, "Rapid Reinforcement for Fusion Spliced Fiblers Using Induction Heating," The Transactions of the IEICE, vol. E 72, No. 1 Jan. 1989.
Copy of International Search Report Aug. 19, 1999 (mailed).

Primary Examiner—Javaid H. Nasri
(74) Attorney, Agent, or Firm—Myers Bigel Sibley & Sajovec

(57) ABSTRACT

A support for a splice in an elongate element such as an optical fiber in which application of the support involves attainment of an elevated temperature, in which there are provided temperature indicator means for providing a visual indication of attainment of a selected temperature or temperature range whereby to assist in determining effective completion of a step in the application process.

23 Claims, 1 Drawing Sheet

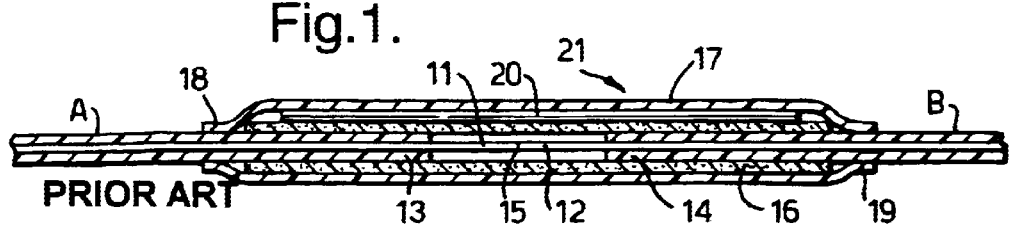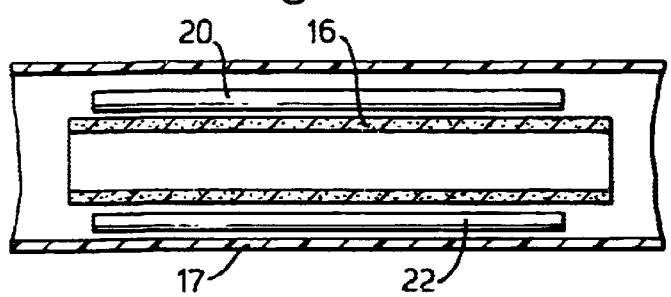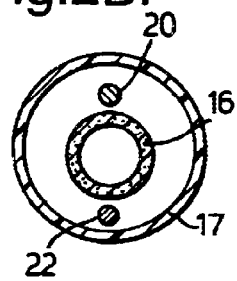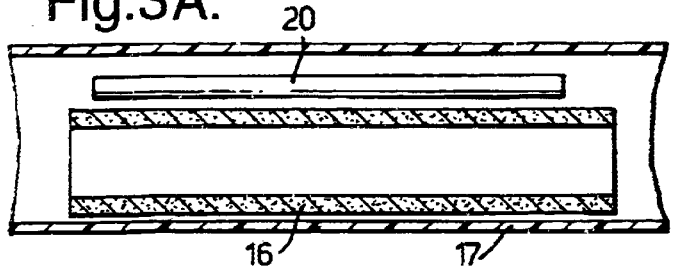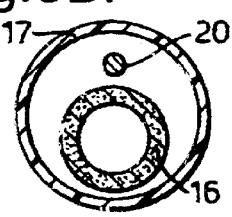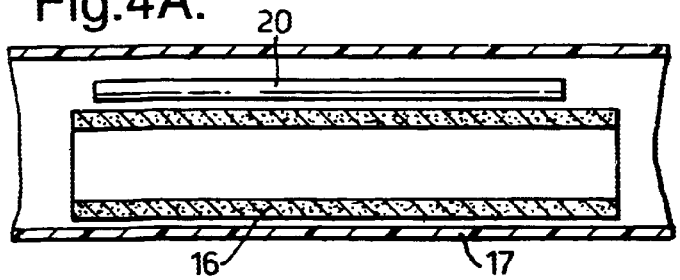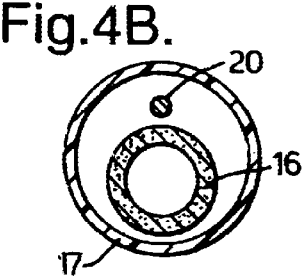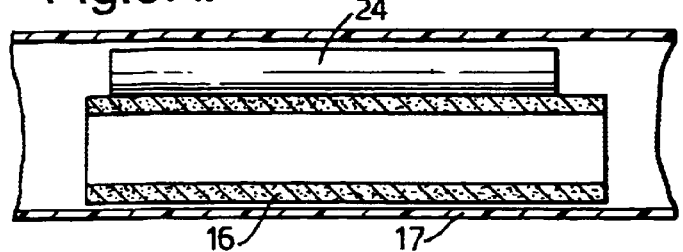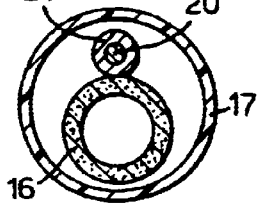

SUPPORT FOR A SPLICE IN AN ELONGATE ELEMENT

RELATED APPLICATIONS

The present application is a National Phase application of PCT/GB99/01152 filed on Apr. 15, 1999 and published in English, which claims priority from Application GB 9809387.5 filed on May 2, 1998.

FIELD OF THE INVENTION

The present invention relates generally to a support for a splice in an elongate element, and to a method of applying such a support.

BACKGROUND OF THE INVENTION

The invention finds particular, but not exclusive, utility in connection with splicing of optical fibres. Optical fibres comprise an inner core of transparent material surrounded by an inner layer of a material having a close but different refractive index and in turn surrounded by a protective cladding layer. When it is necessary to join two optical fibres end-to-end these are spliced by baring the inner core of the end portions of the fibres to be spliced, cleaving the ends and placing them in a closely juxtaposed relationship using equipment capable of ensuring optical alignment of the fibres, and then applying localised heating, for example by appropriately positioned electrodes generating a spark at the junction region, whereby to fuse the end portions of the fiber to form a splice.

Although a spliced region of optical fiber is coherent as far as its optical properties are concerned, the splicing operation leaves the fiber weaker at the junction than in the remaining portion of the fiber, and the fact that it has been bared in order to expose the core for formation of the splice results in a need for additional support to protect the splice against damage due to physical movement. This can be achieved by the application by a splice support sleeve which is preliminarily fitted over one of the fibres to be spliced, and then brought into position over the splice region after the fusion of the junction region has been effected. Splice support sleeves are known comprising a cylindrical body of a dimensionally heat recoverable material the physical dimensions of which can change significantly with changes in temperature (known as "heat-shrink" material). An adhesive which is responsive to temperature change (usually one which melts when the temperature is raised) is provided between the sleeve and the spliced fibres. Sleeves themselves are accurately made to predetermined dimensions such that, upon the application of heat, they shrink to a smaller size thereby applying a firm grip around the end portions of the optical fibres to either side of the splice. Additional reinforcement may be provided in the form of a needle or rod, typically of stainless steel, housed within the splice support sleeve and pressed against the optical fiber as the sleeve shrinks. The adhesive may be provided as an inner element of adhesive sealant material which forms a liner within the sleeve to ensure intimate contact with the optical fiber and, in particular, increase the tensile strength of the bond between the sleeve and the fiber. The adhesive also acts as a sealant to encapsulate the ends of the fibres and protect them from moisture and dust.

In order to effect heat shrinking of a sleeve onto a splice it is positioned within a suitable appliance which heats it to a temperature sufficient to bring the sleeve and the adhesive to the temperature range at which shrinkage takes place. This may be as high as 250° C. At such elevated temperatures, indeed above about 50° C., the heat shrink material and the adhesive are soft and plastic and it is therefore necessary for the sleeve (and the splice within it) to be allowed to cool for some considerable time, a matter of several minutes after heating has been discontinued, before the reinforced splice can be safely handled and positioned, for example, in a splice holder forming part of the installation. If the splice support sleeve is disturbed before it has cooled sufficiently it may be deformed upon fitting to the splice holder as a result of which the optical fiber within it may be flexed or bent, and will be placed under stress. This stress may, over time (with thermal cycling and other variations) result in breakage of the fiber at the splice. This may occur not immediately, but several days, weeks or even months after the splice was made. This is a considerable disadvantage, resulting in the need for service personnel to attend the site to remake a failed splice, as well as the downtime in the equipment the operation of which is affected by the failed splice.

SUMMARY OF THE INVENTION

The present invention seeks to address this problem by providing means by which a splice can be made and reinforced with more accurate information on the temperature of the splice support sleeve and the hotmelt adhesive thereby allowing sufficient time for the sleeve to cool to a temperature at which it can be handled safely without risk of damage to the spliced fiber, but at the same time avoiding unnecessary delays in a procedure which is already somewhat time consuming.

A method and device for reinforcing an optical fiber splice are disclosed in Japanese Patent Application JP 62-021107 A (NTT). In this known method, pressure is applied on the reinforcing member while it is heated and the temperature on the heater surface is monitored. The means by which this monitoring is carried out are not disclosed.

According to the present invention, there is provided a support for an optical fiber splice, the support comprising an elongate support sleeve for protecting and supporting an optical fiber junction point, wherein the application of the support involves attainment of an elevated temperature, characterised by an element the colour of which changes at or in the region of a selected temperature to provide a visual indication of attainment of the selected temperature or temperature range whereby to assist in determining effective completion of a step in the application process.

In the specific application envisaged the attainment of the selected temperature or temperature range will be approached from a higher temperature during cooling although it is possible to envisage circumstances in which the attainment of a temperature from below during heating could also be indicated using a visual temperature indicator as herein defined.

In accordance with the present invention, therefore, the means for providing a visual indication of attainment of a selected temperature or temperature range may be or may include an element the colour of which changes at or in the region of the selected temperature. Other physical properties may, of course, be employed such as the obscuration of a pattern (for example by surface tension as a fusion temperature is approached) loss of transparency or other heat-influenced physical phenomenon.

It is known, for example, that certain materials exhibit specific temperature-related phenomena such as a change in colour at fairly closely defied temperature ranges. One such material is the so-called "liquid crystal" which comprises certain organic substances the molecules of which have an elongate form. This elongate form causes the molecules to align themselves in certain directions for example when low-intensity magnetic fields are applied. Liquid crystals have been widely used in the production of alphanumeric displays making use of the ability of the crystal to vary its reflective or transmissive properties by varying the anisotropy of the physical properties in dependence on applied fields. When used in a digital or alphanumeric display, a thin layer of liquid crystal material is sandwiched between two sheets of glass each having a thin, transparent, coating of conductive material with the viewing side etched into character-forming segments with leads extending to the edges of the display. Voltages applied between the front and back coatings disrupt the orderly arrangement of the molecules sufficient to cause the liquid crystal to change its reflective or transmissive properties whereby to form visible characters.

One particular form of liquid crystal, namely chiral nematic (cholesteric) liquid crystals also have the property that they can reflect light having a wavelength equal to the pitch of separation of the molecules. Because the pitch of separation, assuming the molecules are aligned, is dependent upon temperature the apparent colour, that is the colour of light reflected therefrom, may also depend upon the temperature of the crystal. This makes it possible to provide an indication of a temperature or temperature range by observation of the colour of the liquid crystal. Different specific materials act to reflect different wavelengths so that a wide range of temperatures can be indicated.

It is noted that U.S. Pat. No. 5,686,153 discloses an optical temperature indicator for use in domestic appliances, such as hairdryers and coffee makers. This known temperature indicator comprises a liquid crystalline material.

In the present invention the said means for providing a visual indication of attainment of a selected temperature may comprise or include an element of liquid crystal material, although other suitable materials may be used. Such material may be present as a separate element located within a body of the support (such as a sleeve) in such a way as to be visible from the outside thereof. Suitable materials are commercially available and have known temperature ranges. The man skilled in this art would be able to identify and select an appropriate choice of material from among those commercially available and the materials themselves will not be described in more detail, although examples are given below of two such commercially available materials.

For this purpose at least a part of the said body may be transparent to allow the said temperature indicator means to be visible therethrough.

Alternatively the said temperature indicator means may comprise a temperature-sensitive coating on or on a part of the body of the support itself.

If the said body is an elongate sleeve the said coating may be formed on the outside or the inside surface thereof or incorporated within the body such as to be visible at the surface. When utilising a known structure comprising a sleeve with an internal reinforcing rod, the said coating may be formed on the reinforcing rod.

In embodiments having an elongate sleeve and a heat fusing adhesive sealant sleeve-like element within for bonding to the spliced fiber at a temperature above the said selected temperature, the temperature-indicating material may be present as a coating on or inclusion in the said adhesive sleeve.

The present invention also comprehends a method of splicing optical fibres, comprising the steps of fitting a tubular support over one fiber, fusing the fibres so as to form a splice, positioning the support over the splice, heating the support to a predetermined temperature, and allowing the support to cool, which method is characterised by the steps of determining the attainment of a selected temperature by observing an element of the support the colour of which changes at or in the region of the selected temperature and maintaining the support undisturbed until occurrence of an observable change in the colour of the element.

BRIEF DESCRIPTION OF THE DRAWINGS

Various embodiments of the invention will now be more particularly described, by way of example, with reference to the accompanying drawings, in which:

FIG. 1 is a schematic sectional view of a prior art splice support sleeve;

FIGS. 2A and 2B are respectively an axial section and a cross-section of a first embodiment of the present invention;

FIGS. 3A and 3B are respectively an axial section and a cross-section of a second embodiment of the present invention;

FIGS. 4A and 4B are respectively an axial section and a cross-section through a third embodiment of the invention; and FIGS. 5A and 5B are respectively an axial section and a cross-section through a fourth embodiment of the invention.

DETAILED DESCRIPTION OF THE ILLUSTRATED EMBODIMENTS

Referring now to the drawings, in particular to FIG. 1 which illustrates a conventional fusion splice in an optical fiber, supported by a known splice support sleeve. Two optical fibres, generally indicated A and B having bared end portions 11, 12 formed by removing outer cladding layers 13, 14 are positioned end to end in optical alignment and the contacting end faces of the bared ends 11, 12 are fused at a junction point 15 by application of heat, for example via appropriate electrodes.

The splice region is protected by a support sleeve, generally indicated 21 and comprising an inner sleeve 16 of heat sensitive adhesive sealant material which, upon raising the temperature of the support sleeve 21, is pressed against the splice region intimately by the reduction in diameter of an outer heat-shrink sleeve 17 having opposite ends 18, 19 of reduced diameter whereby, upon shrinking, the end portions grip tightly onto the cladding layers 13, 14 of the optical fibres A, B. within the shrink sleeve 17 there is positioned a reinforcing rod 20, typically of stainless steel, which acts to provide resistance to bending in the splice region.

The splice assembly illustrated in FIG. 1 is shown in the position after fusion of the splice 15, but before the application of heat to cause shrinking of the tube 17. Which causes the adhesive sleeve 16 to be pressed into intimate contact with both the bared ends 11, 12 and the cladding 13, 14 of the optical fibres A, B within the shrink tube 17.

The risk of movement taking place whilst the assembly is still soft from the application of heat to cause shrinkage of the shrink tube 17 is militated against by the provision of means for providing a visual indication of the attainment of a temperature or temperature range to which the support sleeve must fall before it solidifies sufficiently firmly to be handled safely.

FIGS. 2, 3, 4 and 5 are in schematic form and illustrate four different configurations for the provision of such visual temperature indication. In FIGS. 2–5 the same reference numerals are used as in FIG. 1 to identify the same or corresponding components of the assembly. In FIG. 2, the assembly is substantially as in FIG. 1 with the addition of a temperature indicator rod 22 made of or coated with a liquid crystal material the colour of which changes at or around 50° C. which is the safe temperature below which the splice protector sleeve can be handled. The only function of the temperature indicator rod is to provide an indication of the attainment of the critical temperature at which handling becomes safe. In order for the rod 22 to be visible the outer shrink sleeve 17 must be transparent or must include a transparent band through which the rod 22 can be seen.

In FIG. 3 the structure is similar to that of FIG. 1, but here the heat shrinkable sleeve 17 has liquid crystal material incorporated within it such that the colour of the sleeve provides an immediate indication of whether the temperature of the sleeve is above or below the critical temperature. In this embodiment the sleeve does not need to be transparent nor to have any transparent bands as its temperature will be directly indicative of the temperature of the entire assembly. In as much as heat loss occurs from the exterior of the sleeve it may be appropriate to select a suitable liquid crystal material the colour of which changes at a temperature somewhat lower than that of the crystal material of the temperature indicator rod 22 in the embodiment of FIG. 2 in order to accommodate the temperature gradient through the assembly bearing in mind that the interior portions will still be at a higher temperature when the outer sleeve has reached the colour change temperature.

The embodiment of FIG. 4 differs from that of the embodiment of FIG. 3 in that the inner adhesive sleeve 16 has the liquid crystal material incorporated within it. In this embodiment the heat shrinkage sleeve 17 again needs to be transparent or to have a transparent band through which the adhesive sleeve is visible.

As a further alternative the embodiment of FIG. 5 shows a structure in which the reinforcing rod (often called a needle in view of its relatively small dimensions) has a coating of liquid crystal material as a dispersed polymer. In this embodiment the rod 20 may be suitably be painted black to provide an absorbing background before a a coating 24 of the liquid crystal material is applied thereto.

Suitable temperature indicator materials are commercially available. For example, the material may be used in the form of tape or strips and the one suitable product comprises an indicator strip sold by Thermochromic Liquid Crystals Ltd of Deeside Clwyd and the title RTTS (Reversible Temperature Tape Strips). Another material found to be suitable is a reversible temperature paint RP60 produced by Thermax Thermographic Measurements Ltd. This material must be used with care, however, as it contains a mercuric pigment.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An optical fiber splice support, the support comprising:
   an elongate support sleeve configured to support an optical fiber junction point positioned therein responsive to attainment of an elevated temperature; and
   a temperature indicating element within the elongate support sleeve and visible on the elongate support sleeve, a color of which changes at about a selected temperature less than the elevated temperature to provide a visual indication of attainment of the selected temperature while the elongate support sleeve is pressed against the optical fiber junction point.

2. The support of claim 1 wherein the temperature indicating element comprises a liquid crystal material having an associated color characteristic which changes at about the selected temperature and wherein the elongate support sleeve further comprises an inner sleeve of heat sensitive adhesive material that bonds to the optical fiber junction point at a temperature above the selected temperature.

3. The support of claim 1 wherein the temperature indicating element comprises a reversible temperature paint having an associated color characteristic which changes at about the selected temperature and wherein the elongate support sleeve further comprises an inner sleeve of heat sensitive adhesive material that bonds to the optical fiber junction point at a temperature above the selected temperature.

4. The support of claim 1 wherein the temperature indicating element comprises a temperature indicator rod including at least one of a liquid crystal material or a reversible temperature paint having an associated color characteristic which changes at about the selected temperature, the temperature indicator rod being positioned in the elongate support sleeve and wherein the elongate support sleeve includes at least a transparent band through which the temperature indicator rod can be seen.

5. The support of claim 4 wherein the elongate support sleeve further comprises an inner sleeve of heat sensitive adhesive material that bonds to the optical fiber junction point at a temperature above the selected temperature.

6. The support of claim 1 wherein the elongate support sleeve comprises:
   an outer sleeve; and
   an inner sleeve.

7. The support of claim 6 wherein the temperature indicating element comprises at least one of a liquid crystal material or a reversible temperature paint having an associated color characteristic which changes at about the selected temperature visible on the outer sleeve.

8. The support of claim 7 wherein the outer sleeve comprises a heat shrinkable material that shrinks around the optical fiber junction point responsive to attainment of the elevated temperature and wherein the temperature indicating element comprises a liquid crystal material incorporated in the outer sleeve.

9. The support of claim 8 wherein the inner sleeve comprises a heat sensitive adhesive material that bonds to the optical fiber junction point at a temperature above the selected temperature.

10. The support of claim 6 wherein the temperature indicating element comprises at least one of a liquid crystal material or a reversible temperature paint having an associated color characteristic which changes at about the selected temperature associated with the inner sleeve and wherein the outer sleeve includes at least a transparent band through which the inner sleeve can be seen.

11. The support of claim 10 wherein the inner sleeve comprises a heat sensitive adhesive sealant material and wherein the temperature indicating element comprises a liquid crystal material incorporated in the inner sleeve.

12. The support of claim 11 wherein the adhesive sealant material bonds to the optical fiber junction point at a temperature above the selected temperature.

13. The support of claim 6 further comprising a reinforcing rod positioned in the outer sleeve adjacent the optical fiber junction point and wherein the temperature indicating element comprises at least one of a liquid crystal material or a reversible temperature paint having an associated color characteristic which changes at about the selected temperature coating the reinforcing rod and wherein the outer sleeve includes at least a transparent band through which the reinforcing rod can be seen.

14. The support of claim 13 wherein the inner sleeve comprises a heat sensitive adhesive material that bonds to the optical fiber junction point at a temperature above the selected temperature.

15. The support of claim 1 wherein the selected temperature is around 50° C.

16. A support for an optical fiber splice, the support comprising:
  an elongate support sleeve for protecting and supporting an optical fiber junction point, wherein application of the support involves attainment of an elevated temperature; and
  an element within the elongate support sleeve, the color of which changes at about a selected temperature less than the elevated temperature to provide a visual indication of attainment of the selected temperature to thereby assist in determining completion of application of the elongate support sleeve to the optical fiber junction point.

17. A support according to claim 16 wherein the element comprises at least one of a liquid crystal material or a reversible temperature paint.

18. A support according to claim 17 wherein the support sleeve includes an outer sleeve of a heat shrinkable material and wherein the element is located within the outer sleeve and visible from outside thereof.

19. A support according to claim 16 wherein at least part of the support is transparent to allow the element to be visible therethrough.

20. A support according to claim 16 wherein the element comprises at least one of a temperature indicating rod or an inner sleeve within the elongate support sleeve.

21. A support according to claim 20 wherein the element comprises the inner sleeve and wherein the inner sleeve contains a heat fusing adhesive sealant for bonding to the optical fiber splice at a temperature above the selected temperature.

22. A support according to claim 18 wherein the element comprises at least one of a reinforcing rod or the outer sleeve.

23. A method of splicing optical fibers comprising the steps of:
  fitting a tubular support over one of the fibers;
  fusing the fibers so as to form a splice;
  positioning the support over the splice;
  heating the support to a predetermined temperature;
  allowing the support to cool; and
  determining attainment of a selected temperature less than the predetermined temperature by observing an element within the support the color of which changes at about the selected temperature while maintaining the support undisturbed until occurrence of an observable change in the color of the element during cooling of the support.

* * * * *